2 Sheets--Sheet 2.

R. B. ROBBINS.
Corn-Harvesters.

No. 154,958. Patented Sept. 15, 1874.

Witnesses:
Henry N. Miller
W. H. DuHamel

Inventor:
R. B. Robbins.
Per H. S. Abbot.
Attorney.

UNITED STATES PATENT OFFICE.

RICHARD B. ROBBINS, OF ADRIAN, MICHIGAN.

IMPROVEMENT IN CORN-HARVESTERS.

Specification forming part of Letters Patent No. 154,958, dated September 15, 1874; application filed April 22, 1874.

*To all whom it may concern:*

Be it known that I, RICHARD B. ROBBINS, of Adrian, in the county of Lenawee and State of Michigan, have invented certain new and useful Improvements in Corn-Harvesters, of which the following is a specification:

My invention is intended as an improvement upon the corn-harvester for which Letters Patent, No. 149,064, were granted to me March 31, 1874; and the nature of my invention consists in the construction of self-adjusting guides for conveying the corn to the cutting-knives; also, in an adjustable platform upon which the shock is formed. It also consists in a locking device and adjustable arm, and in the construction of a rod and tripping device on the rear of the crane, and also in the combination of parts, as will be hereinafter more fully set forth.

In order to enable others skilled in the art to which my invention appertains to make and use the same, I will now proceed to describe its construction and operation, referring to the annexed drawings, in which—

Figure 1:
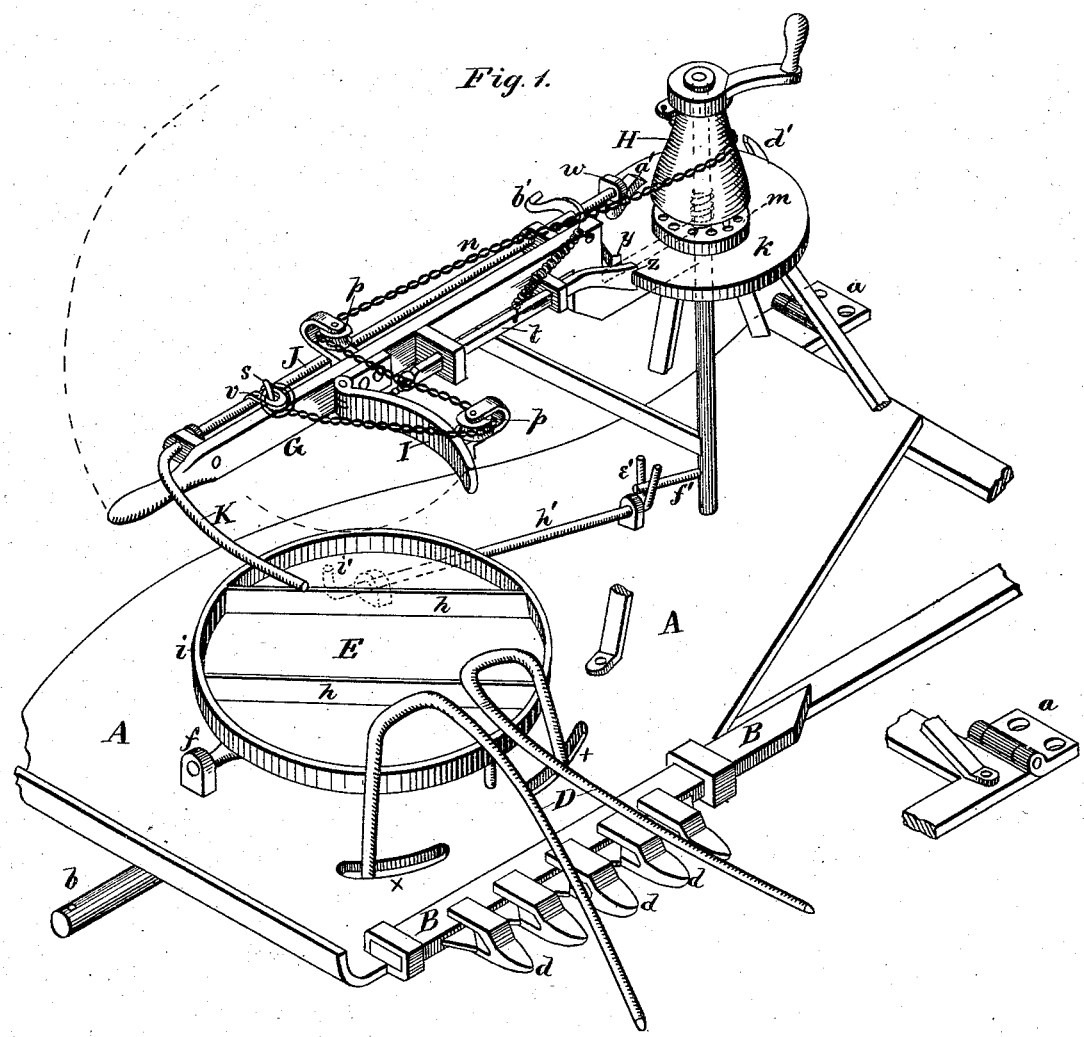
Figure 2:
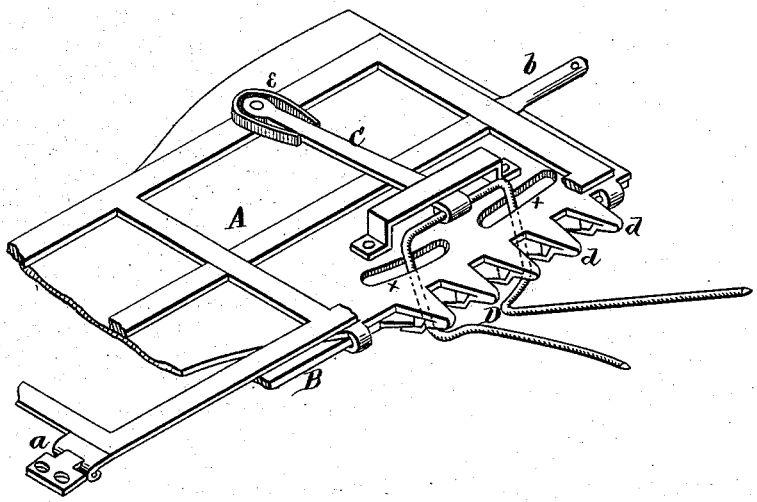

Figure 1 is a perspective view of the platform of a corn-harvester embodying my invention. Fig. 2 is a bottom view of the platform.

A represents the platform for a corn-harvester, provided at its inner edge with hinges $a\ a$, or other suitable devices for attaching it to any of the different styles of reapers and mowers. At the outer edge of the platform A projects a spindle, $b$, upon which a wheel may be placed. $d\ d$ represent the fingers, and B is the reciprocating cutter-bar. On the under side of the platform A, near the rear edge, or a suitable distance therefrom, is pivoted an arm, C, which extends forward, and is held in its normal position by a spring, $e$, acting upon both sides of the bar, so as to stand at right angles with the finger-bar, and opposite the center thereof. In the front end of the bar C is fastened a wire, the ends of which are bent upward and pass through curved slots $x\ x$ in the platform. Above the platform the ends of the wire are bent inward and then forward and outward, as shown in Fig. 1, the whole forming an adjustable guide, D. This guide is self-adjusting, in that the bar C, to which it is attached, will turn upon its pivot and thus adjust the guide to crooked or bent corn-stalks, and carry or convey them to the cutter-bar, and the spring $e$ throws the guide D back again to its normal position. Upon the platform A, in rear of the cutter-bar, is a raised platform, E, hung upon journals $f$, so as to tip over backward and inward, thereby giving the platform E an incline while the shock is being built, and when the crane is brought forward the said platform is leveled by devices hereinafter described, in which position the shock is bound. On this platform E are raised ribs $h$ $h$, and also a raised flange, $i$, around its circumference, for the purpose of preventing the corn slipping off while the machine is in motion. G represents the crane or derrick, the upright shaft of which passes through a plate, $k$, and has a perforated plate, $m$, attached to it above the stationary plate $k$. On the upper end of the shaft of the crane is a drum, H, from which a chain, $n$, passes around pulleys $p\ p$, one of said pulleys being on an arm, I, hinged to the horizontal arm of the crane. The drum H is held up by a spring, and is, on its under side, provided with a lug or pin, which, when the drum is pressed down, passes into one of the perforations on the plate $m$. $s$ is the pin upon which the end of the chain $n$ is to be placed in binding. The crane, with the parts just described, are all constructed substantially in the same manner as described in my patent above referred to. The arm I is connected with a spring-bolt, $t$, which is to enter two notches, $y$ and $z$, on the stationary plate $k$ during the operation of my machine. On the back of the horizontal arm of the crane G is a rod, J, placed in suitable bearings, and having its outer end bent forward, forming the arm K. On this rod is a loop, $v$, fitting over the pin $s$. On the inner end of the rod J is a cam, $w$, to come in contact with a rib, $a'$, on the stationary plate $k$; and the rod is further provided with an arm, $b'$, to come in contact with a stop, $d'$, on the plate $k$. Near the lower end of the crane-shaft is an arm, $f'$, and in bearings on the platform A is a shaft, $h'$, having at its inner end a fork, $e'$, and at its outer end an arm, $i'$.

The operation of my invention is as follows: Supposing that a shock has just been discharged or deposited, the operator takes hold of the crank attached to the drum H and presses down on it till the pin on said drum engages with the perforated plate m, and brings the crane, by turning said crank, back into position, or until the locking-bolt t strikes the first notch, y, in the stationary plate k. During this movement the cam w has been acted on by the rib a', so as to turn the rod J and throw its end K in position for holding the corn. While in this position, and the raised platform E at an angle, the shock is built; and when this is done the operator takes the end of the chain n and places it on the pin s. The operator now takes hold of the crane and brings it forward until the lock or spring bolt t strikes the second notch, z, and, at the same time, the arm f', operating in the fork e', turns the rod h', so that its arm i' will level the platform E. In this position the shock is bound by the driver by means of the chain, and, at the same time, as the chain is tightened around the shock, the bolt t is drawn back and held. The band is now placed on the shock, and the driver, by bearing down on the crank of the drum, reverses the motion of the crank and swings the shock off and around until it is unlocked by the arm b' of the rod J coming against the stop d', which turns the rod so that the loop v will force the end of the chain off of the pin s, thus dropping the shock. This movement of the crane turns the rod h', so as to allow the raised platform E to tilt backward again.

Having thus fully described my invention, what I claim as new, and desire to secure by Letters Patent, is—

1. The guide D, attached to the pivoted arm C, and made self-adjusting by means of the spring e, substantially as and for the purposes herein set forth.
2. The tilting platform E, provided with ribs h h and circumferential flange i, substantially as and for the purposes herein set forth.
3. The combination, with the crane G, arm I, and chain n, of the spring-bolt t and notches y z in the stationary plate k, substantially as and for the purposes herein set forth.
4. The combination, with crane G, rocking rod J, having arm K, and cam w, of rib a', for throwing said arm in position, substantially as herein set forth.
5. The arm b' and stop d', in combination with the rod J and crane G, for the purposes herein set forth.
6. The crane G, provided with pin s, in combination with rod J, loop v, and chain n, substantially as shown and described.
7. The combination of the arm f', fork e', shaft h', and arm i', as and for the purposes herein set forth.

In testimony that I claim the foregoing as my invention I hereunto affix my signature this 20th day of April, 1874.

RICHARD B. ROBBINS.

Witnesses:
WM. EASON,
WILLARD STEARNS.